United States Patent [19]

Holly

[11] 3,995,982
[45] Dec. 7, 1976

[54] MOLDING APPARATUS

[75] Inventor: Harry H. Holly, Boca Raton, Fla.

[73] Assignee: Hollymatic Corporation, Park Forest, Ill.

[22] Filed: Sept. 16, 1974

[21] Appl. No.: 506,270

Related U.S. Application Data

[60] Division of Ser. No. 301,625, Oct. 27, 1972, Pat. No. 3,909,880, which is a continuation-in-part of Ser. No. 244,027, April 14, 1972, Pat. No. 3,928,891.

[52] U.S. Cl. .................................. 425/244; 17/32; 92/182; 425/256; 425/258
[51] Int. Cl.² ........................................ A22C 7/00
[58] Field of Search ......... 425/392, 393, 242, 244, 425/238, 239, 255, 256, 257, 258, 241; 17/32, 40; 92/182

[56] References Cited

UNITED STATES PATENTS

| | | | |
|---|---|---|---|
| 2,686,402 | 8/1954 | Samuel | 92/182 |
| 3,092,880 | 6/1963 | Morton | 18/30 QZ |
| 3,588,948 | 6/1971 | Holly | 17/32 |

Primary Examiner—Francis S. Husar
Assistant Examiner—R. J. Charvat
Attorney, Agent, or Firm—Wegner, Stellman, McCord, Wiles & Wood

[57] ABSTRACT

A molding apparatus for forming articles and especially edible patties from such moldable materials as ground meat, fish and the like in which the apparatus includes a movable mold having a shaping portion therein, pressure means including a pressure chamber for applying pressure to the material therein for forcing the compressed material into the mold and pressure operated seal means communicating with the pressurized material for providing pressure operated seals that substantially prevent escape of the pressurized material from the pressure cavities of the apparatus.

3 Claims, 5 Drawing Figures

MOLDING APPARATUS

CROSS REFERENCE TO RELATED APPLICATIONS

This application is a division of my copending application Ser. No. 301,625, filed Oct. 27, 1972 now U.S. Pat. No. 3,909,880 which is a continuation-in-part of my copending application Ser. No. 244,027, filed Apr. 14, 1972 now U.S. Pat. No. 3,928,891.

BACKGROUND OF THE INVENTION

This invention relates to an improved molding apparatus for molding articles such as food material patties from a moldable material such as meat, fish and the like and having improved means for maintaining pressure on the material to produce firmly packed, shaped articles together with means for using the pressure of the material itself as a hydraulic fluid to produce fluid tight seals in the pressure portions of the apparatus.

The invention also relates to an improved ram structure for applying flowing and shaping pressure to the moldable material with the ram having improved seals for its sides which include the bottom so that the pressure of the material itself operating through the seals tends to prevent leaking of material around the ram.

DESCRIPTION OF THE PREFERRED EMBODIMENT

Figure 1:
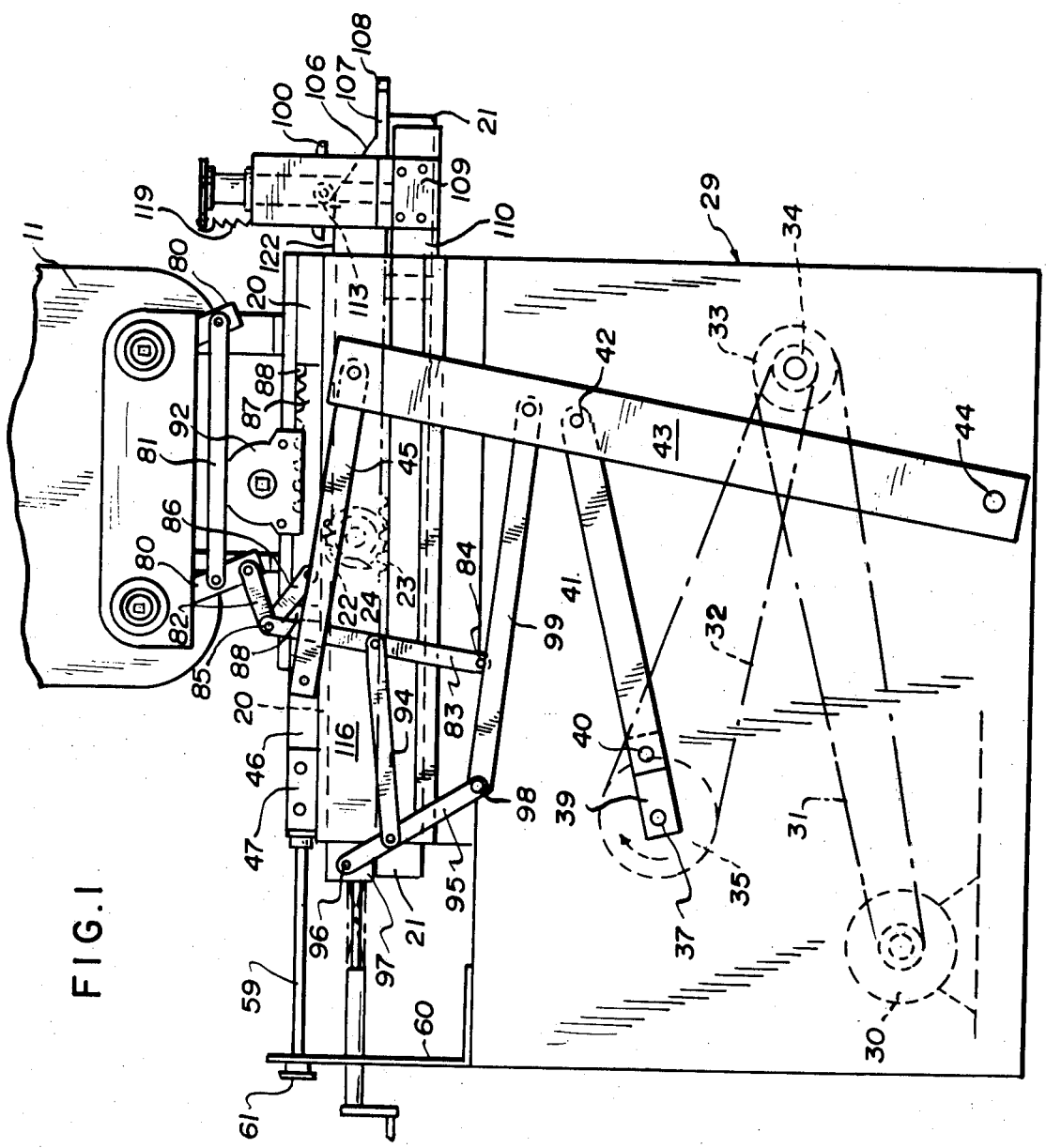
FIG. 1 is a side elevational view partially broken away of a molding apparatus embodying the invention.

In the embodiment illustrated the apparatus includes a hopper 11 having a lower section in which is provided a generally horizontally extending compression chamber 13 having a reciprocable pressure ram 123.

Located at the bottom of the hopper lower section with a forward end extending into the bottom of the compression chamber 13 is a slidable valve plate 129. On top of the valve plate 129 and slidable relative thereto is the pressure means ram 123 adapted to be reciprocated between the extreme forward position of FIG. 3 and return to apply pressure to pressure flowable moldable materail 124 when this material is in the compression chamber 13 as shown in FIG. 3.

Beneath the valve plate 14 on the side opposite the ram 123 is a horizontally reciprocable mold plate 17 that has a plurality of transversely aligned mold openings 18 each of which is circular so as to provide circular patties 19.

Figure 2:
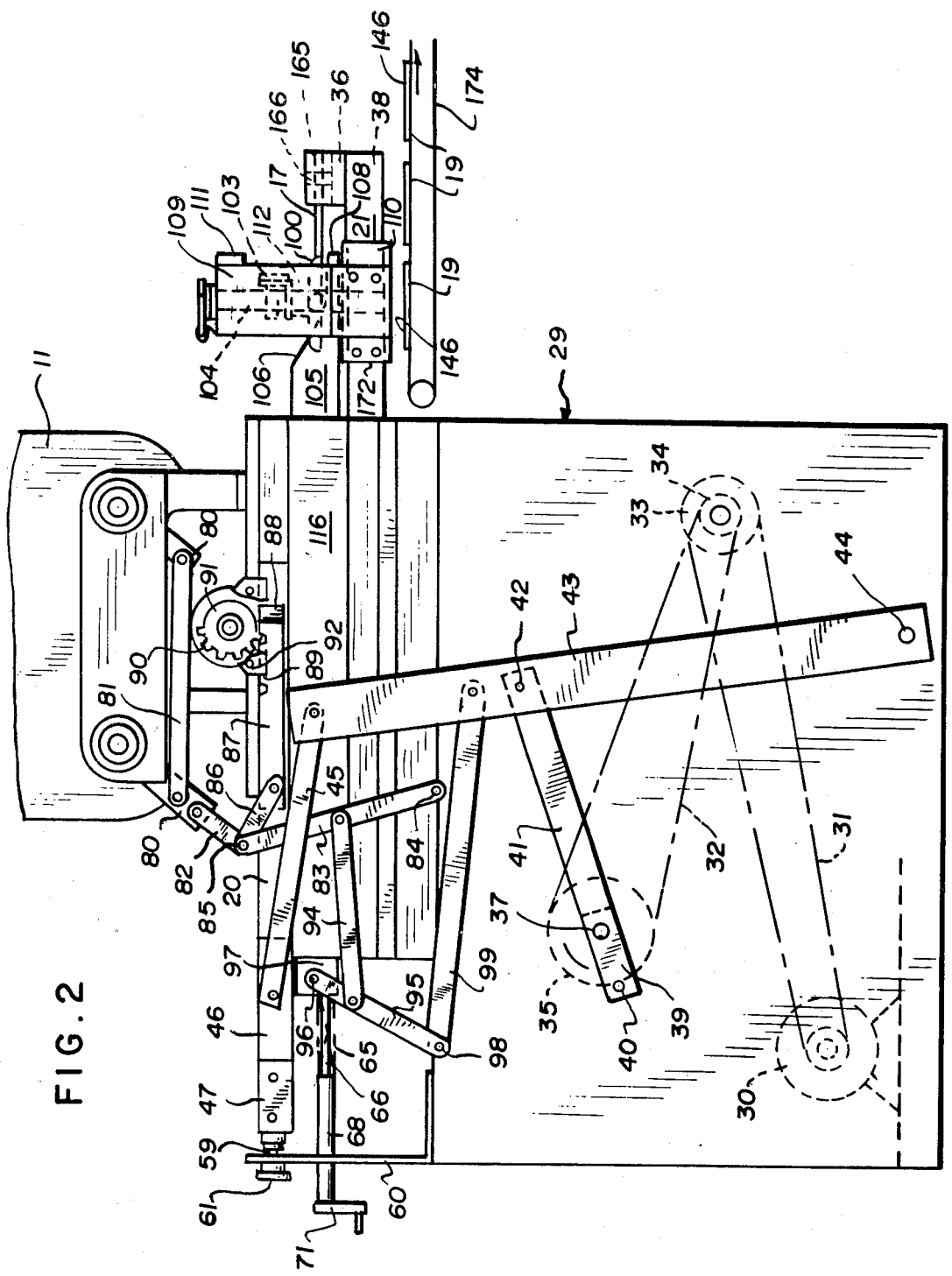
FIG. 2 is a view similar to FIG. 1 but showing the movable parts in opposite positions from the positions shown in FIG. 1.
Figure 3:
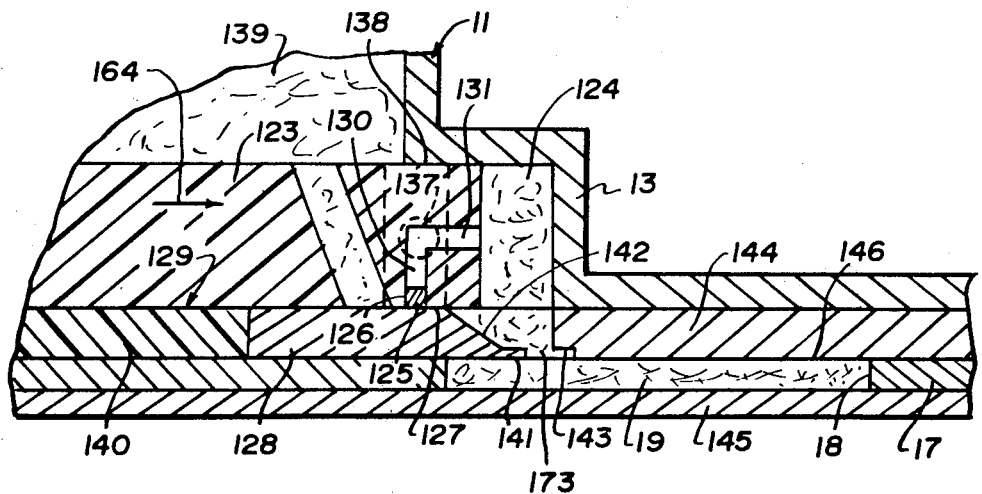
FIG. 3 is an enlarged fragmentary sectional view through a ram and associated structure.

The mold plate 17 is reciprocated between the filling position of FIGS. 1 and 3 and the extended patty removal position of FIG. 2 by upper 20 and bottom 21 racks having teeth 22 and 23 facing each other and engaging an intermediate pinion 24 so that the two racks 20 and 21 move in opposite directions as illustrated and described in prior U.S. Pat. Nos. 3,417,425 and 3,654,665, both assigned to the same assignee as the present application.

There are provided two pairs of racks 20, racks 21 and pinions 24 on opposite sides of the apparatus. The projecting ends of the bottom racks 21 are connected to the end of the mold plate 17 by a mounting strip 36 attached to the racks 21 at flange ends 38 and an overlying bar 165. The assembly of strip 36, bar 165 and intervening end of the mold plate is releasably secured by a pair of connecting pins 166. The racks and attached mold plate 17 are reciprocated back and forth with no pause except for instantaneous reversal of motion at the end of each reciprocation.

The various types of apparatus embodying the invention may utilize units of one or more mold plates, pairs of racks 20 and 21, rams 123 and other cooperating portions of the apparatus as desired to produce either single patties or a multiplicity of patties or similar articles.

As illustrated in FIGS. 1 and 2 where the operating parts of the machine are at their two limits of movement the apparatus is driven by a motor and lever system mounted on and housed within a cabinet 29. This cabinet contains a conventional electric motor and gear reducer combination 30 that drives a shaft 37 through a series of chains 31 and 32 and pulleys 33, 34 and 35.

Mounted on the shaft 37 and rotatable therewith is a short link 39 that is rotatably connected at its outer end by a pin 40 to a longer link 41 whose opposite end is rotatably connected by a pin 42 to an intermediate point on an elongated operating lever 43 having its lower end fulcrumed at 44. The upper or opposite end of the lever 43 is connected by a link 45 to a block 46 attached to the upper rack 20. There are two sets of links 39, 41 and 45 and levers 43 and blocks 46 with the second set being located on the opposite side of the cabinet 29.

Extending rearwardly from each block 46 is a drive bar mounting bracket 47 with a mounting being provided also on each side of the machine and between which extends a transverse drive bar of the type disclosed at 52 in the above U.S. Pat. No. 3,654,665.

In order to adjust the location of the path of movement of the ram 15 so as to adjust the extent of its stroke there is provided a compression adjustment rod 59 that extends through a bracket 60 and is provided with an adjustment knob 61 for rotating the rod 59. With this arrangement rotating the knob 61 and thus the rod 59 moves the ram 123 either forwardly or rearwardly and thereby determines the relative position of the ram 15 at the extremes of its path of movement illustrated by the forwardmost position in FIG. 3.

Each valve plate 129 has on its end adjacent the compression chamber 13 a sloped surface 142 against which the compressed material 124 presses to move the valve plate away from the compression chamber 13 and provide access to the mold opening 18 as shown in FIG. 3. This opening movement of the valve plate 129 is opposed by a helical spring 65 that is preloaded to the desired degree to provide any required amount of resistance to movement of the valve plate.

Each spring 65 is concentric about its valve spring rod 66 with one end of each spring 65 bearing against the valve plate 129 and the opposite end bearing against an adjustable stop 68. The position of the tubular adjustable stop is regulated by rotating the valve adjustment handle 71.

As described and claimed in the above U.S. Pat. No. 3,654,665 the hopper 11 is provided on its oposite sides with rotatable mover devices (not shown) for urging the moldable material and particularly adhesive ground meat 139 toward each ram 123. These devices are moved in increments by reciprocable levers 80 and a linkage 81 in the form of a metal strip hinged to and connecting the levers 80. In order to reciprocate one lever 80 and thus a second lever through the linkage 81 there is provided a short linkage 82 connecting the extended end of one lever 80 to a larger linkage 83 whose opposite end is mounted by a hinge pin 84 to the cabinet 29 of the machine. One end of each linkage 82 and 83 is connected by a hinge 85 which in turn is connected to one end of a short linkage whose other end is hingedly connected to a small rack 87 that is slidably held in a recess 88 on one side of the upper rack 20.

While the levers and linkages for operating the ram or rams are in two sets on opposite sides of the machine there is only one set of linkages and rack 87 for operating the levers 80 and the rack 87. These of course are the linkages and hinge connections 81–86. Similarly, there is only one rack 87 on the one side of the machine.

The teeth 89 of the rack 87 engage the teeth 90 in a reciprocable rotatable pinion 91. This pinion on its outer side operates within the confines of a cover plate 92. The pinion 91 is reciprocated in a back and forth arcuate movement by the longitudinal reciprocation of the small rack 87 to reciprocate an agitator within the lower section of the hopper 11 as disclosed in the above prior U.S. Pat. No. 3,654,665.

In order to reciprocate the levers 80 and the small rack 87 the linkage lever 83 is connected at about its midpoint by a linkage 94 to a linkage 95 between the ends thereof, one end of which is hingedly mounted at 96 to a fixed extension 97 on the machine and the other end hingedly connected at 98 by a linkage 99 to the main operating lever 43 on its side of the machine.

Because of the relative points of connection of the linkages 83, 94, 95 and 99 to each other and then to the operating lever 43 the levers 80 and the small rack 87 move at a faster rate than do the side racks 20 that operate each ram. To provide for this increased speed the recess 88 in which the small rack 87 is located is considerably longer than the rack itself. Thus as shown in FIG. 1 in one extreme position of the operating parts the small rack 87 is at the right extreme of its recess 88 while in the opposite position of the operating parts as shown in FIG. 2 the small rack 87 is at the other end of its recess.

In the illustrated embodiment a knockout cup 100 is provided for each mold opening 18 to remove the formed patties 19 from the openings 18 and drop them onto a conveyor 174 (FIG. 2) as disclosed and claimed in the above copending application Ser. No. 301,625, filed Oct. 27, 1972.

The inverted knockout cups 100 of which one is provided for each mold opening 18 are mounted on a flat strip with an overlying angle bar. The angle bar has a horizontal part overlying the strip and a vertical part. The cup mounting structure is bolted by a bolt 103 at each end to an enlarged section 112 of a vertical slide rod 104.

Attached to each side of the frame 29 of the machine is a horizontally extending cam plate 105 (FIGS. 1 and 2) having a downwardly and forwardly sloped cam surface 106. There is provided one cam plate 105 on each side of the machine and each cam plate at the bottom of the inclined cam surface 106 has a horizontal extension 107 terminating in a horizontal outwardly extending right angle flange 108 acting as a stop. When the knockout cups 100 and associated elements are in their lowermost positions as shown in FIG. 2 with the cups 100 within the mold openings in removing patties 19 therefrom and depositing them on the conveyor 174 the side flanges 108 operate as forward stops for limiting the extent of movement of vertical bars 109 which are attached at each of their bottom ends to a slide block 110 that slides on the bottom rack 21. The two vertical bars 109 carry the inverted cup 100 knockout structure and are connected at their tops by a horizontally extending tie bar 111. In the illustrated embodiment there is enough friction and enough adhesion caused primarily by meat juices to carry the slide blocks 110 and structure attached to the slide blocks along with the side racks 21 until the blocks are stopped by end stops 29 and 108.

When the bottom racks 21 have been retracted fully as shown in FIG. 1 so that the rear ends of the slide blocks 110 abut against the front of the machine frame 29 acting as a stop the knockout cups 100 structure will have been raised to its most elevated position by the rollers 113 (FIG. 1) being at the tops of the substantially parallel inclined cam edges 106. The mold plate 17 is also retracted so that the mold openings 18 are again in filling position (FIGS. 1 and 3). Then when the bottom racks 21 are projected forwardly after the mold openings 18 have been filled with ground meat to form the transverse series of patties the front edges of the vertical bars 109 engage the laterally extending stop flanges 108. At this location the side bars 109 and knockout structure carried thereby remain in knockout position while the side racks 21 and the attached mold plate 17 continue their forward movement.

When the side racks 21 and attached mold plates 17 have reached the furthest extend of their forward movements the knockout cups 100 are then directly vertically aligned with the mold openings 18 and the shaped patties 19 therein. At this position the bottom ends of the slide rods 104 are over the vertical openings (not shown) in the top surfaces of the side racks 21. When this alignment of the rods 104 with the openings occurs side springs 119 attached to top flanges on the vertical rods 104 snap the knockout structure downwardly to the position shown in FIG. 1 where the cups 100 enter the mold openings 18 and dislodge the patties therefrom.

On the return movement of the side racks 21 from their extended positions of FIG. 2 the side racks 21, mold plate 17, side bars 109 and knockout structure carried thereby move rearwardly as a unit. As can be seen in FIG. 2 the initial portion of this movement which is when the forward edges of the bars 109 first move rearwardly away from the side stops 108 causes the side rollers 113 (FIG. 1) to start up the upwardly inclined cam edges 106. This causes the knockout structure to be lifted raising the knockout cups 100 from their mold openings as at this stage the entire structure carried by the side bars 109 is moving at the same horizontal rate of speed as the mold plate 17 even though the mold plate 17 is traveling in a horizontal path while the knockout structure is traveling in an upwardly angled path due to the engagement of the rollers 113 with the inclined edges 106.

By the time the rollers reach the top of the inclined edges 106 or the position shown in FIG. 1 the cups have been completely removed from the mold openings and the engagement of the rear edges 172 of the slide blocks 110 with the adjacent vertical surfaces of the machine frame 29 causes the blocks 110 and the knockout structure carried thereby to stop its rearward motion. The side racks 21 and the attached mold plate 17, however, continue their rearward motion until the mold openings 18 are again aligned with the mold fill slots as illustrated by the fill slot 173 in the embodiment of FIG. 3.

As can be seen, the knockout or patty removal system is compact, simple in structure and very rapid as during its operation it moves with a horizontal component along with the mold plate and its drive structure.

As shown in FIG. 3 the valve plate 129 comprises a solid plastic plate 140 for almost all of its length except that at the front it abuts against a portion 128 that is of steel. Also in the embodiment of FIG. 3 the forward edge of the plate front portion 128 is provided with a bottom substantially flat flange 141. This flange 141 when the valve plate 129 is in its forwardmost position is retained in a groove 143 in the bottom edge of the pressure plate 144. The mold plate 17 slides between this top pressure plate and a bottom pressue plate 145.

Figure 4:
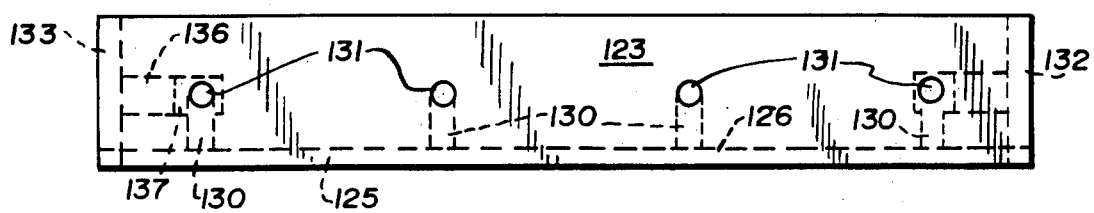
FIG. 4 is a front elevational view of the ram of FIG. 3.
Figure 5:
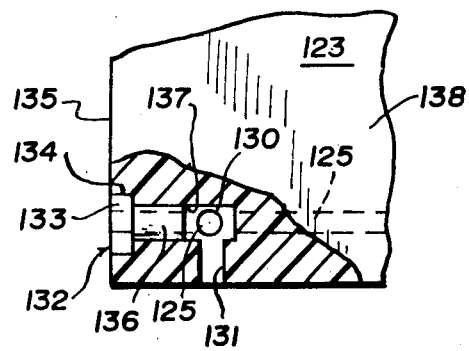
FIG. 5 is a plane view, partially broken away for purposes of illustration, of one front corner of the ram of FIG. 3.

FIGS. 3-5 illustrate embodiments of fluid seals operated by the pressure of the compressed moldable material which is here illustrated as food material. As illustrated, the ram 123 is sealed to the hopper 11 to prevent substantial leakage around the sides and bottom of the ram. The bottom of the ram is sealed by a transverse pressure bar 125 held in a vertical groove 126 so as to be movable relative to the bottom surface 127 of the ram. This bar 125 which may be made of steel is forced against the top surface of the front portion 128 of the valve plate 129 by the pressure of the meat 124 in the chamber 13.

In order to subject the top part of the pressure bar 125 to this pressure of the meat 124 there are provided in the illustrated embodiment four upwardly extending passages 130 that communicate with the groove 126 in which the pressure bar 125 is located. Each of these plurality of passages 130 communicate at their upper ends with a forwardly extending passage 131 whose front ends are open to the pressurized material 124 in the chamber 13. Thus as the pressure in this chamber 13 builds up the pressure is transmitted by the material in the passages 130 and 131 as a hydraulic fluid to the top of the pressure bar 125. Thus the greater the pressure of the material 124 the greater the downward sealing force on the pressure bar 125. The pressure of the material 124 also forces the top surface 138 of the ram 123 into sealing engagement with the top of the compression chamber 13 (FIG. 3).

The sides of the ram 123 are sealed by pressure members 132 which may also be made of steel and which each comprises a vertically extending rectangular plate 133 positioned within a similarly shaped groove 134 on each side surface 135 of the ram 123. Each plate 133 is provided with a centrally located stem 136 at about its midpoint slidably held in a similarly shaped opening 137 that extends inwardly of the groove 134 and communicates with a forward opening passage 131. Thus, as can be seen in FIG. 5 the passages 130, 131 and 137 all join so that the pressure of the material 124 in the compression chamber 13 operating through these passages simultaneously presses the bottom bar 125 and the side seal plates 133 into sealing engagement with the adjacent hopper surfaces.

Having described my invention as related to the embodiment shown in the accompanying drawins, it is my intention that the invention be not limited by any of the details of description, unless otherwise specified, but rather be construed broadly within its spirit and scope as set out in the appended claims.

I claim:

1. Molding apparatus for forming shaped articles from a pressurized moldable material, comprising: mold means including a shaping cavity; a pressure chamber communicating with said cavity; a pressue ram movable in said chamber toward said cavity for pressurizing said material; supply means operatively communicating with said pressure chamber for supplying moldable material to said pressure chamber, said pressure chamber extending between and interconnecting said cavity and said pressure ram whereby said ram supplies pressure to said material in said chamber and in said cavity, said ram and compression chamber having adjacent surfaces defining a space therebetween through which pressurized material tends to leak; a movable seal member on said ram bodily pressure movable to close said space and restrict substantial leakage of said moldable material during said pressurizing of said material; and a material passage operatively interconnecting said pressure chamber and said seal member.

2. The apparatus of claim 1 wherein said seal member and material passage are both located in said ram.

3. The apparatus of claim 2 wherein moving means are provided for moving said ram into and out of said chamber, said ram has a plurality of said surfaces adjacent to said compression chamber surfaces and a said sealing member is located at each of said plurality of ram surfaces.

* * * * *